(No Model.)  2 Sheets—Sheet 1.

G. A. ROBERTS.
DUMP CAR.

No. 528,279. Patented Oct. 30, 1894.

Witnesses
L. J. Whittemore
A. L. Skabby

Inventor
George A. Roberts
By Wm. S. Sprague
Attys.

(No Model.) 2 Sheets—Sheet 2.

G. A. ROBERTS.
DUMP CAR.

No. 528,279. Patented Oct. 30, 1894.

Witnesses
L. J. Whittemore
A. L. Hobby

Inventor
George A. Roberts
By Mr. S. Sprague
Attys.

UNITED STATES PATENT OFFICE.

GEORGE A. ROBERTS, OF THREE RIVERS, MICHIGAN.

DUMP-CAR.

SPECIFICATION forming part of Letters Patent No. 528,279, dated October 30, 1894.

Application filed May 21, 1894. Serial No. 511,935. (No model.)

*To all whom it may concern:*

Be it known that I, GEORGE A. ROBERTS, a citizen of the United States, residing at Three Rivers, in the county of St. Joseph and State of Michigan, have invented certain new and useful Improvements in Dump-Cars, of which the following is a specification, reference being had therein to the accompanying drawings.
The invention consists in the peculiar construction of a car having a hopper and a cutoff for the bottom of the hopper, with actuating devices for said cut-off, driven from the wheels, and means in the track for throwing said devices into and out of operation; further in the peculiar construction of such cutoff in the end of a flexible platform carried upon endless chains or cables and driven from the track wheels of a car, and, further in the peculiar construction, arrangement and combination of the various parts.

Figure 1:
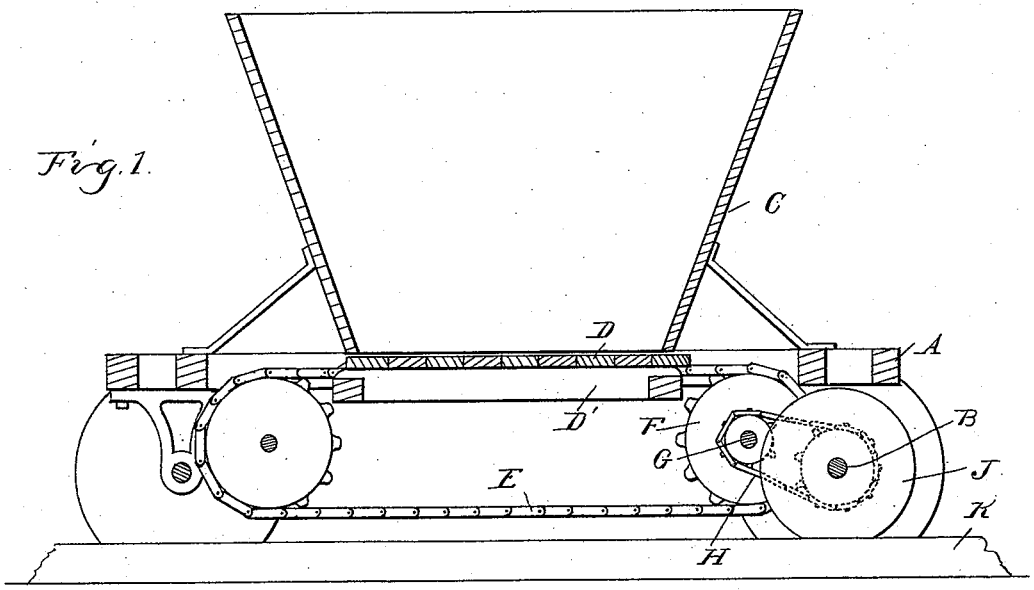
Figure 2:
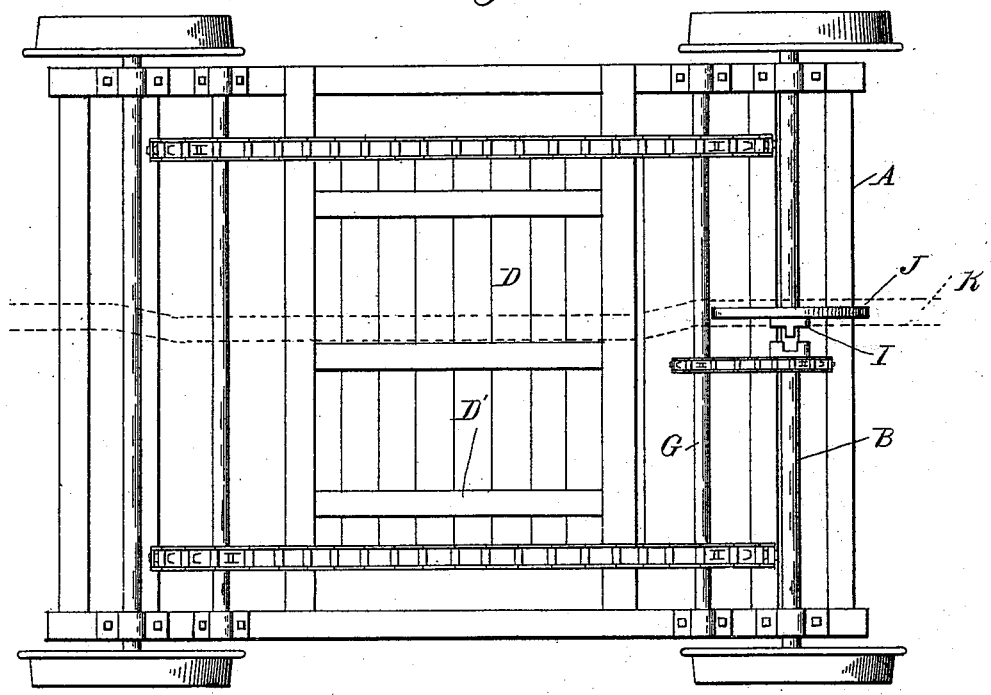
Figure 3:
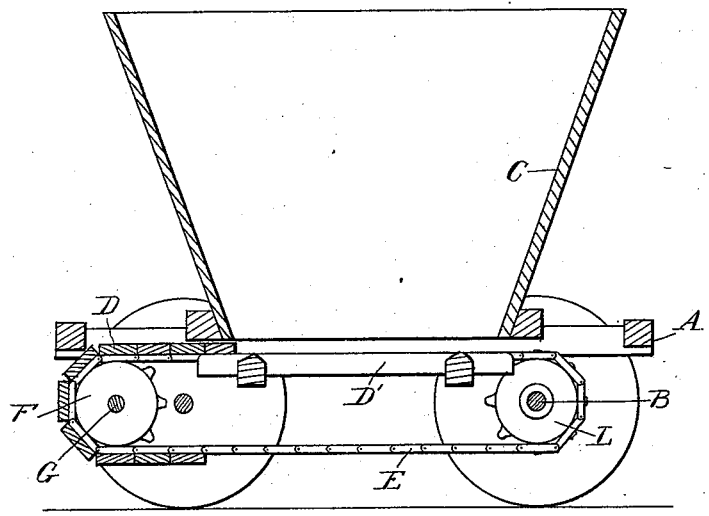
Figure 4:
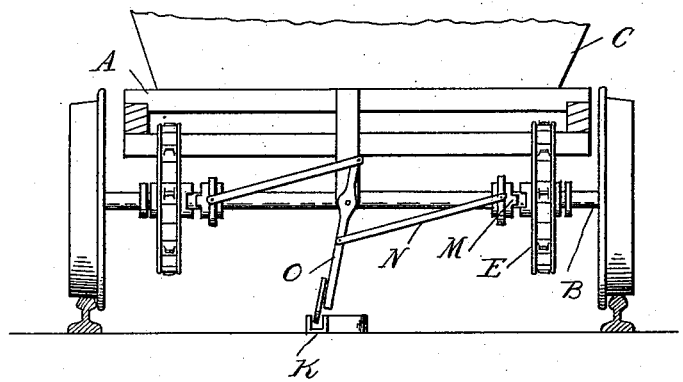

Figure 1 is a vertical, central, longitudinal section through a car embodying my invention. Fig. 2 is a bottom plan view thereof.
Fig. 3 is a section similar to Fig. 1, showing a slightly modified form. Fig. 4 is an end elevation of the car showing the actuating devices for throwing the cut off in and out of operation, with the construction shown in Fig. 3.

A is a suitable frame supported on the wheeled axles B. This frame is provided with a central aperture over which is supported the hopper C. Beneath the outlet from the hopper is a cut-off or door, which preferably consists of a series of slats D, resting at their ends on rails or guide strips D' and secured to the endless chains or ropes E which pass over wheels F journaled on shafts G on the under side of the frame. One of the shafts G is geared in any suitable manner to one of the axles B, as for instance, by the sprocket wheels and chain. Shown at H in Fig. 1. The sprocket wheel on the axle is loose, thereon and may be connected therewith by any suitable clutch device, such for instance, as that shown at I, Fig. 2, which consists of a collar sliding on a spline on the shaft and having suitable engaging devices, such as teeth or ribs for engaging corresponding grooves or notches in the hub of the sprocket wheel on the axle B.

This collar is secured to a wheel or disk J of suitable diameter to project in proximity to the track and engaging into a cam way K therein.

The parts being thus constructed their operation is as follows: The hopper being filled, the clutch I being disengaged from the sprocket wheel on the axle, the car may be moved to any desired point without imparting motion to the cut-off D. When the car reaches a point where it is desired to dump the contents of the hopper, and at which the cam way K is located and as the car approaches that cam way, the disk J will engage therein and be shifted laterally so as to throw the clutch I into engagement with the sprocket wheel on the axle, and thereby drive that sprocket wheel and the shaft G through the gear described, moving the cut off D laterally away from the mouth of the hopper and permitting the contents thereof to be discharged. When the disk I reaches the end of the cam way it will move in the reverse direction and disengage the clutch from the sprocket wheel.
In the return of the car the disk engaging in the cam way as described will cause the cut off to move into position again beneath the hopper and then be disengaged, leaving it in that position, so that the hopper may again fill and the operation be repeated.

Instead of supporting the chains E upon two auxiliary shafts G I may support one only on such auxiliary shaft outside of one axle and have sprocket wheels L sleeved upon the other axle, as shown in Fig. 3. This enables me to shorten up the car considerably.

In this construction I prefer to use the devices shown in Fig. 4 for engaging the sprocket wheels L with the drive axle of the car. In that figure M are collars keyed to the shaft and having suitable engaging devices to connect with the hubs of the sprocket wheels L. These collars are connected by the connecting rods N to opposite sides of the pivotal point of a lever O, which engages in a cam way in the track the same as the disk I.

What I claim as my invention is—

1. In a dump car, the combination of a wheeled platform, a hopper thereon, a cut off for the bottom of the hopper, actuating devices for said cut-off from the wheels, and means in the track for throwing said devices in and out of operation, substantially as described.

2. In a dump car, the combination of the wheeled platform, a hopper thereon, a sliding cut-off for the bottom of the hopper, an endless chain connected to the cut-off and to gearing on one of the axles, a clutch for connecting the axle and gearing to actuate the cut off and means brought into operative position by the motion of the car for controlling the clutch, substantially as described.

3. In a dump car, the combination of the wheeled platform, a hopper thereon, rails at the sides of the discharge from the hopper, slats forming a cut off for the hopper, having their ends resting upon the rails, endless chains to which said slats are connected, sprocket wheels arranged on transverse shafts with which said chains engage, and a clutch for connecting and disconnecting the sprocket wheels with one of the car axles, substantially as described.

In testimony whereof I affix my signature in presence of two witnesses.

GEORGE A. ROBERTS.

Witnesses:
JAMES B. ROBERTS,
GEORGE KELLER.